April 26, 1932. F. F. MANOR 1,855,861
TANDEM WHEELED AIRPLANE
Filed Sept. 23, 1929    2 Sheets-Sheet 1
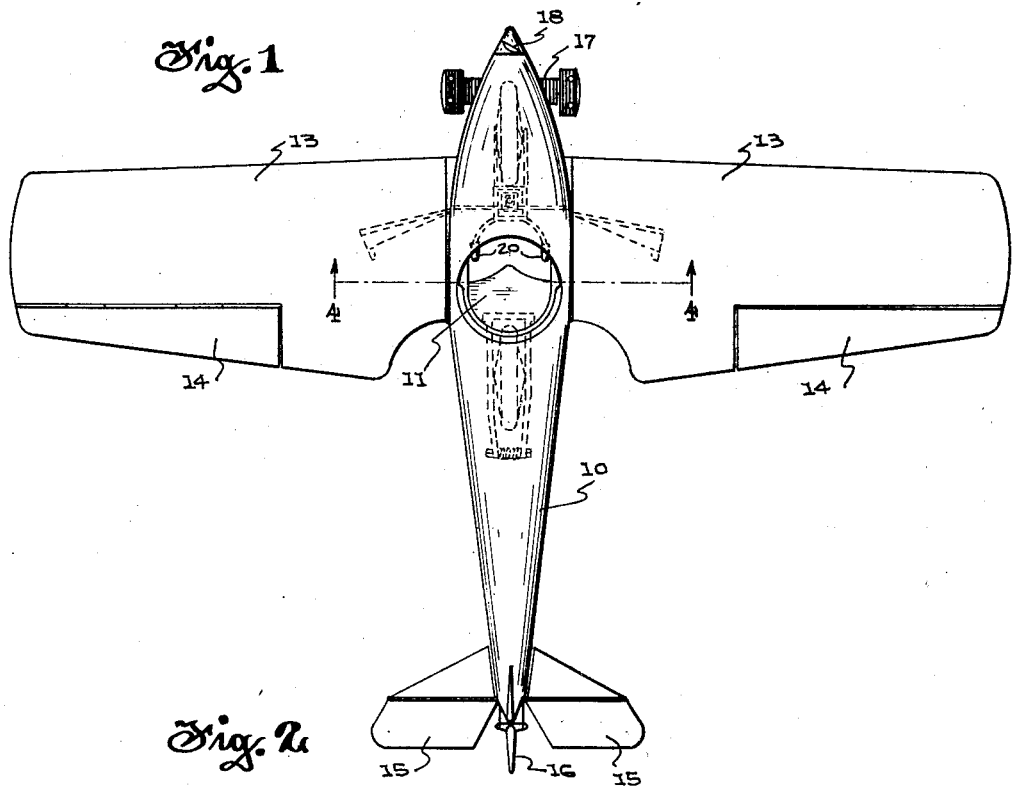
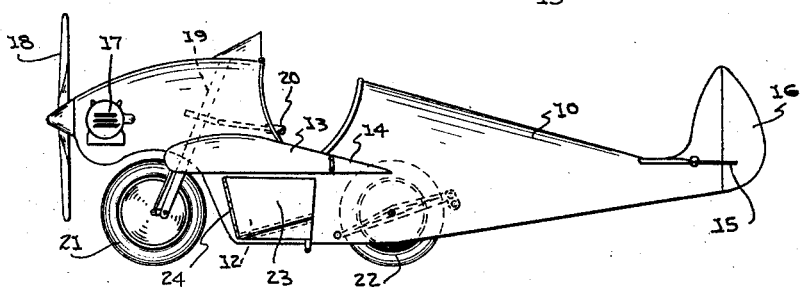
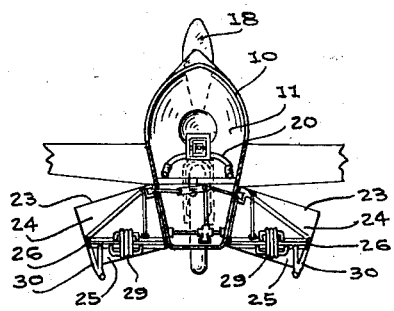
INVENTOR.
Florian F. Manor
BY
Morsell, Kenney & Morsell
ATTORNEYS April 26, 1932.  F. F. MANOR  1,855,861
TANDEM WHEELED AIRPLANE
Filed Sept. 23, 1929  2 Sheets-Sheet 2
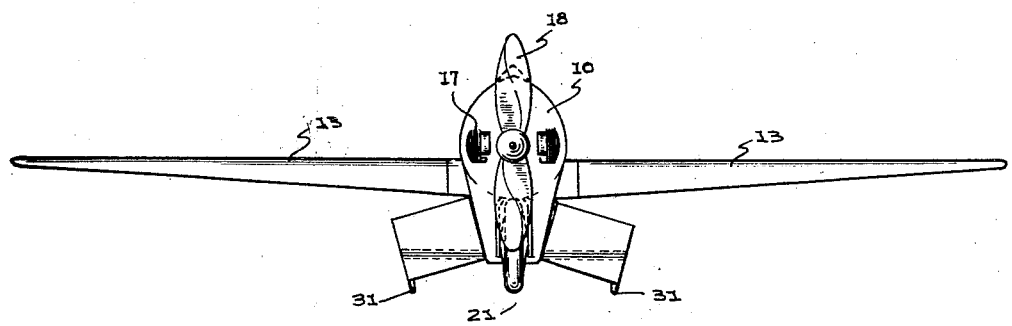
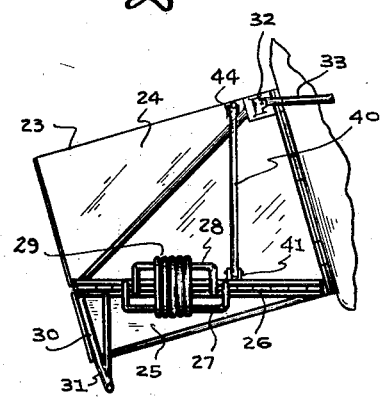
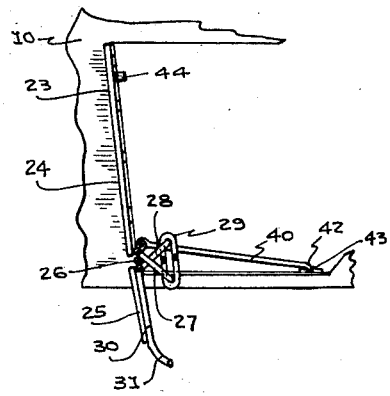
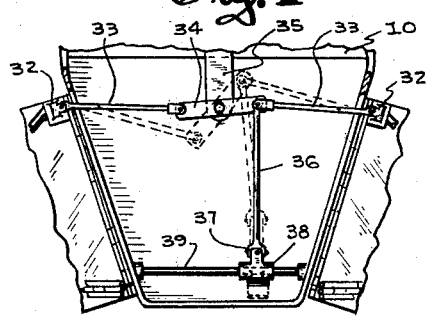
INVENTOR.
Florian F. Manor
BY
Morsell, Kunzy & Morsell
ATTORNEYS.

Patented Apr. 26, 1932

1,855,861

UNITED STATES PATENT OFFICE

FLORIAN F. MANOR, OF OSHKOSH, WISCONSIN

TANDEM WHEELED AIRPLANE

Application filed September 23, 1929. Serial No. 394,718.

This invention relates to improvements in tandem wheeled airplanes. It is one of the objects of this invention to provide a tandem wheeled airplane having novel means for supporting the vehicle when it is at rest and when it is in the act of taking off or landing.

A further object of this invention is to provide a tandem wheeled airplane having a supporting means of the type described, which is adapted to be automatically moved to an inoperative position when the airplane has attained flying speed so that the supporting means will offer no resistance during flight.

It is a further object of this invention to provide a tandem wheeled airplane in which the supporting means is provided with locking members for positively holding the supporting means in open position when the airplane is being "taxied" in a strong wind.

A further object of this invention is to provide a tandem wheeled airplane having a supporting means provided with a resiliently mounted ground engaging portion.

A further object of this invention is to provide a tandem wheeled airplane in which the supporting means may be moved to open position and held in such position by means of a conveniently positioned foot pedal.

A still further object of this invention is to provide a tandem wheel airplane having combination supporting means and doors, the said doors being so hinged and shaped as to be entirely clear of the ground when closed and to touch the ground when open.

With the above and other objects in view, the invention consists of the improved tandem wheeled airplane and all its parts and combinations, as set forth in the claims and all equivalents thereof.

In the accompanying drawings, in which the same reference numerals designate the same parts in all of the views:

Fig. 1 is a plan view of the airplane;

Fig. 2 is a side elevational view thereof;

Fig. 3 is a front elevational view showing the supporting means in open position;

Fig. 4 is a sectional view taken on line 4—4 of Fig. 1;

Fig. 5 is an enlarged detail view of one of the supporting members in open position;

Fig. 6 is an enlarged detail edge view of one of the supporting members in open position; and Fig. 7 is a transverse sectional view showing the operating mechanism for the supporting members.

Referring to the drawings, the numeral 10 designates the body of the airplane, said body being formed with an open cockpit 11 and with lower openings 12 on each side of the cockpit.

The body portion is further provided with wings 13 having the usual ailerons 14 on connection therewith, and with elevators 15 and a rudder 16. An engine 17, which is mounted in the forward portion of the body, is directly connected to a propeller 18.

A steering post 19 has its upper end positioned within the body and provided with handle bars or suitable controlling means 20, and has its lower end, which is in the form of a fork, projecting from the lower portion of the front of the body. A single front wheel 21 is mounted within the forked portion of the steering post, and said wheel is steerable by means of the handle bars 20. A single rear wheel 22 is mounted within a recess below an intermediate portion of the body.

The important feature of this invention resides in the means for supporting the airplane in upright position when it is at rest or when it is in the act of taking off or landing. The said means comprises supporting members or doors 23, which are hinged along one of their edges to the sides of the lower openings 12 of the body as at 24. The said doors are each formed of two sections, an upper section 24, and a lower section 25 (see Fig. 5). The said sections are hinged together as at 26 along a line which extends obliquely with respect to the lower edge of the door. A U-shaped member 27 has its ends rigidly secured to the lower edge of the upper section, and extends at an angle downwardly therefrom. A similar U-shaped member 28 has its ends rigidly secured to the upper edge of the lower door section, and said member extends at an angle upwardly therefrom within the U-shaped member 27. Bands 29 of suitable yielding material are wrapped around said U-shaped members as shown. Thus when the lower section of the door tends to swing rearwardly, it will stretch the bands 29, thereby providing a resilient connection. Drag members 30 are secured to the outer edges of the lower door sections, and said drags have curved portions 31 which project below the lower edge of the doors and which are adapted to engage the ground when the doors are in open position.

Connecting members 32 are pivoted near the upper hinge edges of each of the doors, and links 33 have one end pivoted to said connecting members 32. A lever member 34 is centrally pivoted to a bracket 35, which is connected with the body. The links 33 have their inner ends pivotally connected to the ends of the lever member 34. A link 36 has its upper end pivotally connected to one end of the lever member 34, and has its lower end connected by a universal joint 37 to the inner end of a foot pedal 38, the latter being pivotally mounted on a rod 39.

To provide means for positively locking the doors in open position when desired, locking rods 40 have been provided. The said rods have their inner ends pivotally connected to the doors as at 41, and have their outer ends formed with a curved portion 42 for engaging a member 43 in connection with the body to hold the doors in open position, as shown in Fig. 6. When it is not desired to use the locking members, they may be swung upwardly, as shown in Fig. 5, their upper ends engaging a spring fastening 44.

In operating the airplane the pilot places his foot upon the pedal 38 to hold the doors in the open position. The motor is then opened, and as the airplane gains speed the foot is removed from the pedal, and the doors will automatically swing to closed position because of the forward speed and the propeller blast. During flying the doors are kept closed, and they thus offer no resistance. After loading and when about to come to a stop, the pilot once more places his foot upon the pedal 38 and opens the doors. When the machine is at rest, the doors will stay open due to the inclined hinges. The pilot may hold them open either by keeping his foot upon the pedal or by swinging down the locking rods 40 to the position shown in Fig. 6. As the doors strike the ground when opened, the drag members 30 will engage the ground, and due to the yieldingly pivoted lower section 25, will give sufficiently to travel over normally rough ground. When the plane "taxies" along the ground in a strong wind, with locking rods 40 locked, the lower sections of the doors will give and hold the tandem wheel plane upright even when going over rough and bumpy ground.

It is to be noted that, due to the downwardly converging sides of the body, and due to the manner of hinging the doors, the drag members will touch the ground only when the doors are open.

In the drawings the device is shown as used in connection with an open airplane. When used in connection with a closed plane, the supporting members may serve as entire doors for the cabin.

Although the invention is more particularly adapted for use in connection with tandem wheeled airplanes, it may be used in connection with other types. In the drawings only one form of the invention has been shown and described, but it is not desired to be limited to this exact form, as the broad concept of the invention includes all changes and modifications which may fairly come within the scope of the claims.

What I claim is:

1. In an airplane having a body portion provided with wheels, supporting means in hinged connection with said body portion, said supporting means being swingable laterally with respect to the body from an out of the way position to a ground engaging position to supplement the wheels in supporting the airplane when the latter is on the ground.

2. In an airplane having a body portion provided with tandem wheels, supporting means in hinged connection with said body portion, said supporting means being swingable laterally with respect to the body from an out of the way position to a ground engaging position to supplement the tandem wheels in supporting the airplane when the latter is on the ground.

3. In an airplane having a body portion provided with tandem wheels, supporting means in hinged connection with said body portion, said supporting means being horizontally swingable from a position closely adjacent to and substantially parallel with the side of the body to a ground engaging position at an angle from said side of the body to supplement the tandem wheels in supporting the airplane when the latter is on the ground.

4. In a tandem wheeled airplane having a body portion provided with side openings therein, doors hinged to the body adjacent said openings, said doors when in open position being adapted to engage the ground to supplement the tandem wheels in supporting the airplane.

5. In a tandem wheeled airplane having a body portion provided with side openings therein, doors hinged to the body adjacent said openings, said doors having resiliently mounted lower portions which are adapted to yieldingly engage the ground when said doors are in open position to supplement the tandem wheels in supporting the airplane.

6. In a tandem wheeled airplane having a body portion provided with side openings therein, doors hinged to the body adjacent said openings, said doors having resiliently hinged lower portions which are adapted to yieldingly engage the ground when said doors are in open position to supplement the tandem wheels in supporting the airplane.

7. In a tandem wheeled airplane having a body portion provided with side openings therein, doors hinged to the body adjacent said openings, and means operable by the pilot for causing said doors to open simultaneously, said doors when in open position being adapted to engage the ground to supplement the tandem wheels in supporting the airplane.

8. In a tandem wheeled airplane having a body portion provided with side openings therein, doors hinged to the body adjacent said openings, and means operable by the pilot for causing said doors to open simultaneously, said doors when in open position being adapted to engage the ground to supplement the tandem wheels in supporting the airplane, and said doors being adapted to automatically close upon forward movement of the airplane.

9. In a tandem wheeled airplane having a body portion provided with side openings therein, doors hinged to the body adjacent said openings, and means for positively holding said doors in open position, said doors when in said open position being adapted to engage the ground to supplement the tandem wheels in supporting the airplane.

10. In a tandem wheeled airplane having a body portion provided with side openings therein, doors hinged to the body adjacent said openings, and a rod for each door having one end hinged to the door and having the other end engageable with the body for positively holding said doors in open position, said doors when in said open position being adapted to engage the ground to supplement the tandem wheels in supporting the airplane.

11. In an airplane having a body portion provided with wheels, doors hinged to opposite sides of said body portion, said doors when in open position being adapted to engage the ground to supplement the wheels in supporting the airplane.

12. In an airplane having a body portion provided with wheels, doors hinged to opposite sides of said body portion, said doors having resiliently mounted lower portions which are adapted to yieldingly engage the ground when said doors are in open position to supplement the wheels in supporting the airplane.

13. In an airplane having a body portion provided with wheels, doors hinged to opposite sides of said body portion, and means operable by the pilot for causing said doors to open simultaneously, said doors when in open position being adapted to engage the ground to supplement the wheels in supporting the airplane.

In testimony whereof, I affix my signature.

FLORIAN F. MANOR.